United States Patent Office 3,549,617
Patented Dec. 22, 1970

3,549,617
BRIGHTENING WATER-SOLUBLE CELLULOSE DERIVATIVES
Herbert W. Whitmeyer, Limestone Gardens, Wilmington, Del., assignor to E. I. du Pont de Nemours and Company, Wilmington, Del., a corporation of Delaware
No Drawing. Filed Mar. 13, 1968, Ser. No. 712,612
Int. Cl. C08b 3/22, 11/20
U.S. Cl. 260—232
10 Claims

ABSTRACT OF THE DISCLOSURE

Slurrying a water-soluble cellulose derivative in aqueous aliphatic alcohol, in which said cellulose derivative is insoluble, in the presence of bisulfite ions at a pH between about 2 to 6.9; agitating the slurry for at least about 5 minutes; and separating the brightened cellulose derivative from the aqueous aliphatic alcohol.

BACKGROUND OF THE INVENTION

Highly purified substantially white or uncolored cellulose derivatives are preferred for many uses, especially in food products, pharmaceutical and cosmetic preparations. Color formation that occurs during the manufacture of water-soluble cellulose derivatives has been minimized by using highly purified chemical cellulose and other process materials free of objectionable impurities; by suitable temperature control during etherification or esterification of the cellulose; by appropriate care in drying the purified product; and by using corrosion-resistant equipment in the storage and processing of the reactants and in the preparation of the cellulose derivatives. Still, in spite of taking all the precautions mentioned above, the resulting water-soluble cellulose derivatives usually have a yellowish cast or an off-white color which is less white and bright than that of the cellulose employed in making the cellulose derivative, and is especially noticeable in aqueous solutions of the derivative. The colored impurities, present perhaps only in concentrations of a few hundredths of a percent in the refined cellulose derivative, are released when the derivative is dissolved in water where the color easily can be detected and may be objectionable. To obtain white or colorless products, various bleaching agents have been used to remove the color and brighten the cellulose derivatives. However, the bleaching agents generally used are oxidizing agents such as hydrogen peroxide, chlorine dioxide, chlorine, chlorites and hypochlorites. Although treatment of the water-soluble cellulose derivatives with such bleaching agents is effective in minimizing or eliminating color and in producing brighter cellulose derivatives, use of such bleaching agents often is objectionable or even may be excluded because these bleaching agents cause some cleavage of the polymer chains thus giving the cellulose derivative a substantially lower average degree of polymerization (DP). A water-soluble cellulose derivative thus bleached or decolorized and also partially degraded by such a bleaching agent has a lesser thickening action in aqueous systems than does the derivative having a higher average degree of polymerization, and indeed may be useless in a given application because of the alteration in the thickening or viscosity-building action of the bleached product.

SUMMARY OF THE INVENTION

It has been discovered that certain cellulose derivatives can be brightened by a process which comprises slurrying a water-soluble cellulose derivative in an aqueous aliphatic alcohol having 1 to 4 carbon atoms, in which said cellulose derivative is insoluble, in the presence of bisulfite ions at a pH of from 2 to 6.9, agitating the slurry maintained within said pH range for at least about 5 minutes thereby brightening the cellulose derivative, and separating the brightened cellulose derivative from the aqueous aliphatic alcohol. Small amounts of bisulfite ion in the aqueous alcoholic slurry effect brightening of water-soluble cellulose derivatives when the aqueous alcohol is within the indicated pH range. Generally, the bisulfite concentration in the aqueous alcoholic slurry is at least about 0.02 mol per average mer weight of the cellulose derivative, and preferably is about 0.3 mol per average mer weight of the cellulose derivative. By "average mer weight" is meant the weight of an anhydroglucose unit having a degree of substitution corresponding to the average degree of substitution for the cellulose derivative. The bisulfite ions can be supplied from any source, for example an alkali metal sulfite or bisulfite, an alkaline earth metel sulfite or bisulfite, or sulfur dioxide can be added to the aqueous alcohol slurry as a source of bisulfite ions, but generally and preferably an alkali metal bisulfite, formed in situ and dissolved in the aqueous alcohol slurry is the source of bisulfite ions. The addition of dilute acids or acid-reacting compounds to the slurry containing a soluble sulfite or bisulfite, e.g. acetic acid or $SO_2$ added to sodium sulfite solution, forms bisulfite ion and also lowers the pH of the aqueous alcohol slurry to within the required range. The acid used is one that produces metal salts that remain in solution in the aqueous alcohol, and hence are removed from the cellulose derivative when it is separated from the aqueous alcohol.

The pH of the aqueous alcohol containing bisulfite ion must be in the range of about from 2 to 6.9 to obtain brightening of the cellulose derivative, and preferably is from 5 to 6. Any aqueous aliphatic alcohol having 1 to 4 carbon atoms or mixtures thereof can be used as the slurry medium in the process. The temperature of the slurry in which brightening is accomplished is about from 0° to 80° C., preferably about from 30° to 60° C. Agitation of the slurry held at a pH of about from 2 to 6.9 is continued for at least about 5 minutes, and usually not more than about 30 minutes agitation is required to brighten and purify the cellulose derivative. The resulting cellulose derivative is purer and whiter than a cellulose derivative not treated with bisulfite ions in the manner described and, further, substantially no degradation of the cellulose derivative occurs. When highest purity cellulose derivative is desired, said derivative can be separated from the slurry and washed, after bisulfite treatment, until contaminant-free, that is free from residual metal salts and other soluble impurities that might still be present. This can be accomplished by washing the cellulose derivative with an aqueous aliphatic alcohol having 1 to 4 carbon atoms in which said derivative is not soluble and is not gelled. The washing liquid can be any of the aqueous aliphatic alcohols used to slurry the cellulose derivative during the bisulfite brightening step, and preferably is methanol, ethanol or isopropanol. The brightened water-soluble cellulose ethers and esters are especially suitable for use in food, cosmetics and pharmaceutical preparations where uncolored cellulose derivatives that are substantially pure and have good viscosity-building properties are required.

PREFERRED EMBODIMENTS

The process of this invention can be used to purify and brighten water-soluble cellulose derivatives such as cellulose ethers and cellulose esters that are substantially insoluble in aqueous aliphatic alcohols, regardless of the method of preparation of the cellulose derivative. Representative water-soluble cellulose derivatives that can be brightened according to the process of this invention are sodium carboxymethyl cellulose, methyl cellulose, hydroxyethyl cellulose, sodium cellulose sulfate, sodium cellulose acetate sulfate and sodium sulfoethyl cellulose. Especially good results are obtained when sodium carboxymethyl cellulose is brightened and purified by the present process. The aqueous aliphatic alcohols having 1 to 4 carbon atoms employed in the brightening process often are used as the reaction medium in the etherification of cellulose, and in purification of water-soluble cellulose ethers and esters.

The brightening and purifying process of this invention can be carried out in a continuous manner as an additional processing step in a slurry-process cellulose-etherification reaction by adding a source of bisulfite ions to the aqueous aliphatic alcohol reaction medium after formation of the water-soluble cellulose derivative. Under such conditions a liquid aromatic hydrocarbon such as benzene or toluene also may be present during brightening. Then, too, brightening and purification can be conducted on the water-soluble cellulose derivative after it has been prepared by any other suitable method, and possibly dried. In such case, the water-soluble cellulose derivative is slurried in an aqueous alcohol containing bisulfite ions at the required pH. The aqueous alcohols in which the cellulose derivatives are insoluble have a two-fold function:

(1) they remove impurities from the cellulose derivative, and (2) they function as a reaction medium for bisulfite brightening of the cellulose derivative. Therefore, both bleaching and purification can be conducted simultaneously. The presence of bisulfite ions in the slurry medium is required for brightening the cellulose derivative, and good results are obtained when at least 0.02 mol of bisulfite ion is present per average mer weight of the cellulose derivative. The source of bisulfite ion is immaterial, and it can be supplied by adding to the aqueous alcoholic slurry a soluble alkali metal bisulfite, alkaline earth metal bisulfite or other compounds that yield bisulfite ion in an acidic medium, for example, alkali metal sulfites or alkaline earth metal sulfites or mixtures thereof. Especially good results are obtained when $SO_2$ is employed as the source of bisulfite ion in the aqueous alcohol. The precise means by which the formation of bisulfite ions in the slurry is accomplished is not critical, for example, alkali metal bisulfite such as sodium bisulfite can be added directly to the aqueous alcohol containing the cellulose derivative. Likewise, $SO_2$ can be added directly to the aqueous alcohol containing the cellulose derivative by bubbling $SO_2$ through the slurry while, preferably, agitating the mixture or; alternatively, an atmosphere of $SO_2$ can be maintained above the slurry mixture containing the cellulose derivative while the mixture is agitated, thus dissolving the $SO_2$ in the aqueous alcohol in contact with the water-soluble cellulose derivative. Preferably, $SO_2$ is added to an alkaline reaction mixture containing the water-soluble cellulose derivative slurried in an aqueous alcohol, thereby forming a soluble metal sulfite in the slurry medium, and continuing the addition of $SO_2$ until the pH of the slurry liquid is lowered into the desired range, e.g. from 5 to 6, thus generating the bisulfite ion that is needed for brightening the cellulose derivative. The amount of $SO_2$, or for that matter any source of bisulfite ion, added must be sufficient to provide at least 0.02 mol of bisulfite ion for each average mer weight of celluose derivative, and the pH of the slurry medium during the bisulfite brightening step must be between 2 and 6.9, preferably 5 to 6. Although the compounds added to the slurry medium as a source of bisulfite ions can reduce the pH to within the required range, a modification of the procedure involves adding dilute acids, e.g., acetic acid, formic acid or nitric acid to the aqueous slurry in order to reduce the pH, provided, of course, that at least 0.02 mol of bisulfite ion is present per average mer weight of cellulose derivative. The acid can be added to the aqueous alcoholic slurry before, during or after the source of bisulfite has been added, but preferably is added after the source of bisulfite is in the slurry. In any event, whether bisulfite ion generated by $SO_2$ alone is used or a bisulfite salt is used with an an acid to assist in regulating the pH, agitation of the slurry is conducted for at least 5 minutes in order to provide good contact between the cellulose derivative and the brightening agent.

After bisulfite treatment, the bleached and brightened cellulose derivative is separated from the aqueous alcoholic liquid by any effective means such as, for example, filtration or centrifugation. When high purity is to be assured, the cellulose derivative, after bisulfite treatment, is washed until it is contaminant free. Purification of the cellulose derivative is attained by washing it, one or more times, wtih additional aqueous alcohol such as is used and described above in the bisulfite brightening step. Washing is continued until the low molecular weight metal salts and other soluble contaminants are removed from the cellulose derivative. Usually two or three re-slurryings in an aqueous aliphatic alcohol having 1 to 4 carbon atoms, followed by separation from the wash liquid, achieve the desired high degree of purification, after which the purified, whitened and brightened cellulose derivative can be dried in any suitable manner for packing and shipment. In order to insure that the cellulose derivative is free of acid, the pH of the last wash liquid can be adjusted to about 7 to 8 with alkali, for example, caustic soda.

The purified and brightened cellulose derivatives made by the process of this invention are substantially free of sulfur-containing impurities and are purified and brightened without significant loss in viscosity, that is, without significant reduction in the average degree of polymerization, in contrast to degradation which accompanies bleaching of such cellulose derivatives by the heretofore used oxidizing type bleaching agents. Furthermore, this process can be carried out at convenient temperatures, whereas cooling and low temperatures are required even to minimize, much less to eliminate, viscosity loss of water-soluble cellulose derivatives brightened with oxidizing type agents.

In the following examples, the whiteness of a cellulose derivative before and after being bleached and brightened by the present process is measured by use of a Photovolt Photoelectric Reflection Meter, Model 610, available from the Photovolt Corporation, New York, N.Y. The procedure involves filling a sample tray to overflowing with the dry cellulose derivative, and smoothing the surface by a combination rolling and sliding movement of a glass rod across the top of the tray. Incident light striking the surface of the material in the sample tray is observed through a blue tristimulus filter at an angle of 45° and is compared with light from the same source that is reflected from calibrated vitreous enamel reflectance standards to obtain a whiteness expressed in instrument units.

The viscosity of the cellulose derivative that is brightened by the process of the present invention is determined by ASTM Method D–1439–65 using a Brookfield "Synchro-Lectric" Viscometer available from the Brookfield Engineering Laboratories.

EXAMPLE 1

62.6 parts of 60-mesh purified wood pulp (4.2% moisture) was agitated with 328 parts of ethanol (92.4% alcohol, 7.6% $H_2O$), 304 parts of benzene and 7.8 parts of water. While agitation continued, 65.2 parts of 50% aqueous sodium hydroxide was added, and the slurry was steeped for 30 minutes at 30° C. 35 parts of monochloroacetic acid was added, and agitation of the mixture was continued for 70 minutes at 60° C. $SO_2$ then was added at a rate of 1.63 g./min. below the surface of the slurry mixture maintained at about 60° C. until the pH of the slurry liquid was reduced to 5.5 and the bisulfite ion concentration was about 0.3 mol per average mer weight of the NaCMC. The slurry was agitated for an additional 5 minutes and then filtered. The filter cake was given 3 successive washes by slurrying it for 15 minutes in about 1100 parts of 60% ethanol maintained at 45° C. The pH was adjusted to 7.5 with sodium hydroxide in the last wash liquid. The dried sodium carboxymethyl cellulose (NaCMC) was white, had a brightness of 86 units, and contained only traces of NaCl, sodium glycolate, and sodium sulfite. A 1% solution in water had a viscosity of 3892 centipoises indicating that substantially no degradation of the polymer had occurred.

In comparison, when the etherification mixture was neutralized with acetic acid and washed three times with 60% ethanol in the manner described above, but omitting the $SO_2$ treatment, the NaCMC was equally pure, as determined by analysis, and had a viscosity of about 3000 cp. in 1% aqueous solution, but had a brightness of only 75 units.

EXAMPLE 2

Commercially pure NaCMC, purified in the conventional manner by washing with an aqueous organic solvent, is brightened and further purified by dispersing 70 g. of said NaCMC in about 1 liter of 60% ethanol. The slurry is agitated and held at 45° C. while $SO_2$ is added until the pH drops to about 6.5, stirring being continued for another 10 minutes, by which time significant brightening of the cellulose derivative is observed. The sulfite ion generated by the $SO_2$ is about 0.029 mol per weight of the starting NaCMC, which has a brightness of about 72 units. The brightened cellulose derivative is separated by filtration, and is reslurried in the same amount of fresh 60% ethanol, the pH is adjusted to about 7.5 by adding 10% NaOH solution, and the brightened and purified NaCMC is separated from the slurry and dried. The viscosity of an aqueous solution of the brightened NaCMC is substantially identical with the viscosity of an aqueous solution of the commercial NaCMC used as the starting material, and the brightness is 75.

EXAMPLE 3

The procedure of Example 1 is repeated using portions of the same cellulose and other reagents, but addition of $SO_2$ to the alkaline etherification mixture is continued only until the pH value is reduced to about 8.0. Agitation of the slurry is continued while sufficient acetic acid is added to reduce the pH of the slurry to about 5.5, the bisulfite ion concentration being about 0.3 mol per average mer weight of the cellulose derivative. Brightening of the suspended solid is apparent during this period. The slurry is agitated for an additional 5 minutes, and then processed as in Example 1. The brightness and viscosity of the resultant NaCMC are comparable to those observed for the NaCMC of Example 1.

EXAMPLE 4

50 parts of purified cotton linters is suspended in 789 parts of tertiary butyl alcohol. The resulting slurry is stirred and 208 parts of a 30% aqueous solution of sodium hydroxide is added over a period of ½ hour at a temperature varying from 28 to 32° C. Agitation is continued for about ½ hour and the temperature of the reaction mass is reduced to 17° C. 73 parts of solid monochloroacetic acid is added over a period of ½ hour. The reaction mixture is heated to 55° C. for 1½ hours and held at 55° C. for four additional hours, with continuous agitation. The reaction medium is drained from the fibrous NaCMC. The fibrous product is dispersed in 70% methanol, agitated, and $SO_2$ is added at a rate of 1.8 grams per minute until the pH of the liquid is about 5 and the amount of bisulfite ions is about 0.1 mol per average mer weight of the NaCMC. Agitation of the slurry is continued for about five minutes. A bright-white NaCMC is obtained, the gain in brightness being comparable to that obtained in Example 1, and viscosity studies indicate that substantially no degradation occurred.

EXAMPLE 5

Approximately 202 parts of wet NaCMC filtered from a slurry etherification mixture, as described in Example 1 above, was dispersed in about 1100 parts of 60% ethanol. The slurry was heated to 45° C. and the liquid was acidified by passing in $SO_2$ until the pH was about 5.9. About 0.2 mol of the bisulfite ion was present per average mer weight of NaCMC. The slurry was agitated for 15 minutes at about 45° C., the solid was separated, and then was given two additional washes as described in Example 1 above, adjusting the pH to 7.5±0.5 in the last wash. The dried product NaCMC had a brightness of 84. The degree of polymerization, as measured by the viscosity of a 1% aqueous solution of the NaCMC, was comparable to material treated analogously but omitting the $SO_2$ treatment.

EXAMPLE 6

Crude pyridine cellulose sulfate is prepared substantially as described in U.S. Pat. 1,734,291 whereby 22 parts of chlorosulfonic acid is mixed with 250 parts of anhydrous pyridine and 10 parts of activated cotton linters. The temperature during esterification is about 100° C. The reaction mixture is cooled and the pyridine cellulose sulfate is separated from excess pyridine by filtration through a perforated plate. The crude pyridine cellulose sulfate is dissolved in about nine times its weight of 45%, by weight, ethanol. 50% Sodium hydroxide solution is added with vigorous stirring until the ethanol solution is basic to phenolphthalein. The resulting solid sodium cellulose sulfate (SCS) is separated by filtration and suspended in about 9 parts by weight of 50% ethanol for each part of SCS and is treated with $SO_2$, as described in Example 1, until the pH of the solution is about 6. Substantial whitening of the cellulose ester is obtained and the bleached SCS is separated by filtration, given one more wash in 50% ethanol with adjustment of pH to about 7.5, and finally is washed with 95% ethanol before drying, to avoid formation of hard lumps in the dried product. Viscosity studies of the brightened cellulose ester indicate substantially no degradation of the polymer.

EXAMPLE 7

Crude water-soluble sodium sulfoethyl cellulose (SSEC) is made in a known manner by the reaction of shredded refined chemical cellulose, sodium hydroxide, and sodium sulfoethylchloride is about 88% isopropainol at reflux temperature. The resulting cellulose ether is slurried in 60% isopropanol, and $SO_2$ is bubbled through the agitated slurry until the pH of the aqueous organic liquid is about 6.5. Agitation is continued for an additional 6 minutes, the slurry is neutralized to pH 7.5, and the solid brightened SSEC is filtered therefrom, and washed once with 97% isopropanol. The cellulose ether is dried to produce a bright, white, refined SSEC having a degree of etherification of about 0.56. Viscosity studies indicate that substantially no degradation occurs during the brightening treatment.

EXAMPLE 8

Water-soluble sodium sulfate cellulose acetate, prepared by a procedure described in U.S. Pat. 2,582,009, is brightened and purified by treating said cellulose ester, slurried and agitated in 60% ethanol, with $SO_2$ as described in Example 1 above. The brightened cellulose ester that results has suffered no degradation of the polymer.

EXAMPLE 9

60 g. commercial refined NaCMC (color 72, purity about 99.5%) was slurried by agitating in 1 liter of 60% ethanol at a temperature of 45° C. Agitation was continued while $SO_2$ (about 3.5 g.) was added to the mixture. The color of the NaCMC noticeably decreased during addition of the $SO_2$ and the pH of the slurry fell from about 7.5 to about 4.0. Stirring was continued for about 5 minutes, the brightened NaCMC was separated by filtration, then reslurried in about 1 liter of 60% ethanol, the pH of the slurry was adjusted to 7.5 by adding NaOH solution, the NaCMC again was separated by filtration and dried. The color of the treated, brightened NaCMC was 82 units.

What is claimed is:

1. A process for brightening cellulose derivatives which comprises slurrying a water-soluble cellulose derivative in an aqueous aliphatic alcohol having 1 to 4 carbon atoms, in which said cellulose derivative is insoluble, in the presence of at least about 0.02 mole per average mer weight of cellulose derivative of bisulfite ions of a pH of about from 2 to 6.9, agitating the slurry maintained within said pH range for at least about 5 minutes thereby brightening the cellulose derivative, and separating the brightened cellulose derivative from the aqueous alcohol.

2. A process of claim 1 wherein $SO_2$ is added to the aqueous alcohol as a source of bisulfite ions.

3. A process of claim 2 wherein the water-soluble cellulose derivative is sodium carboxymethyl cellulose.

4. A process of claim 3 wherein the pH is maintained between about 5 to 6.

5. A process of claim 3 wherein a dilute acid is added to the aqueous alcohol in combination with $SO_2$ to lower the pH.

6. A process of claim 3 wherein the aqueous aliphatic alcohol is ethanol.

7. A process of claim 3 wherein the temperature of the slurry during brightening is about from 30° to 60° C.

8. A process of claim 3 wherein the brightened sodium carboxymethyl cellulose is washed with an aqueous aliphatic alcohol to remove residual impurities.

9. A process of claim 8 wherein the pH of the aqueous alcohol used to wash the cellulose ether is between about 7 and 8.

10. A process of claim 1 wherein the water-soluble cellulose derivative is sodium sulfoethyl cellulose.

References Cited

UNITED STATES PATENTS

| | | | |
|---|---|---|---|
| 1,510,735 | 10/1924 | Baybutt | 260—232 |
| 2,103,639 | 12/1937 | Richter | 260—232 |
| 2,109,509 | 3/1938 | Schneider | 260—232 |
| 2,159,375 | 5/1939 | Freeman et al. | 260—231 |
| 2,321,069 | 6/1943 | Dreyfus | 260—232 |
| 2,582,009 | 1/1952 | Crane | 260—215 |
| 2,607,772 | 8/1952 | Rigby | 260—232 |
| 2,675,377 | 4/1954 | Malm et al. | 260—215 |
| 2,821,489 | 1/1958 | McNeer et al. | 117—144 |
| 3,075,962 | 1/1963 | Hiatt et al. | 260—215 |
| 3,341,516 | 9/1967 | Savage et al. | 260—232 |

OTHER REFERENCES

Channon, Values of Acidic Reducing Agents in Kraft Bleaching, Technical Association of the Pulp and Paper Industry, vol. 36, No. 5, May 1953, pp. 198A and 200A.

DONALD E. CZAJA, Primary Examiner

R. W. GRIFFIN, Assistant Examiner

U.S. Cl. X.R.

260—212, 214, 215